United States Patent [19]

Miyashita et al.

[11] Patent Number: 5,070,954
[45] Date of Patent: Dec. 10, 1991

[54] MOBILE CARRIAGE

[75] Inventors: Susumu Miyashita, Kodaira; Nori Harada, Ome, both of Japan

[73] Assignee: Kioritz Corporation, Tokyo, Japan

[21] Appl. No.: 663,772

[22] Filed: Mar. 4, 1991

Related U.S. Application Data

[63] Continuation of Ser. No. 345,591, May 1, 1989, abandoned.

[30] Foreign Application Priority Data

Oct. 30, 1987 [JP] Japan .................. 62-165281

[51] Int. Cl.$^5$ .................. B62D 11/02
[52] U.S. Cl. .................. 180/6.62; 180/233; 180/274; 74/665 GE
[58] Field of Search .................. 180/6.2, 6.48, 6.5, 180/6.62, 6.66, 274, 279; 280/2.55; 74/665 GE, 664, 89.2, 89.21, 89.22; 293/2, 117; 239/722, 146, 172

[56] References Cited

U.S. PATENT DOCUMENTS 4,766,772  8/1988  Tsuchie .................. 280/255 X

FOREIGN PATENT DOCUMENTS 78103168  6/1988  Taiwan .

Primary Examiner—Charles A. Marmor
Assistant Examiner—Alan M. Kager
Attorney, Agent, or Firm—Browdy and Neimark

[57] ABSTRACT

A mobile carriage comprises wheels which are respectively rotatably provided through one-way clutches at each end of wheel shafts disposed at the front and rear of the carriage, the wheels at the front of the carriage in the moving direction thereof serving as driving wheels so that the carriage can be driven backwardly and forwardly using a prime mover.

5 Claims, 1 Drawing Sheet

MOBILE CARRIAGE

This application is a continuation of application Ser. No. 07/345,591, filed 05/01/1989 now abandoned.

BACKGROUND OF THE INVENTION

The present invention relates to an improvement of a mobile carriage used, for example, as a pest control apparatus for the growing of vegetables in greenhouses.

The pest control of vegetables growing in greenhouses is generally carried out by using a manual sprayer because of the limited space for working in a small greenhouse. However, since there is a great danger of chemical injury to the human body, a so-called hose-car is sometimes used in which an automatic hose winding reel and a spray nozzle boom are mounted on a mobile carriage which automatically runs along a furrow in a back and forth motion, as disclosed in Japanese Patent Publication No. 59-8187.

Conventional house-cars of either the two-wheel or four-wheel drive types, however, involve certain drawbacks with respect to running along furrows and thus cannot be operated in a completely automatic manner.

Such conventional house-cars also have a disadvantage in that they are incapable of making sharp turns and cannot be easily turned when it is desired to enter into a next furrow.

SUMMARY OF THE INVENTION

Accordingly, it is an object of the present invention to provide a mobile carriage which comprises pairs of wheels respectively rotatably provided through one-way clutches at each end of wheel shafts disposed at the front and rear of the carriage, only the wheels at the front of the carriage in the moving direction thereof being driven. Since the driving force automatically changes in correspondence with any change in the resistance acting on each of the wheels, the mobile carriage of the present invention not only offers good performance in terms of moving along furrows and is capable of making sharp turns, but is also suitable for use in small greenhouses and unmanned working as it has none of the disadvantages of conventional house-cars and offers a high level of practicability.

DESCRIPTION OF THE PREFERRED EMBODIMENT

Figure 1:
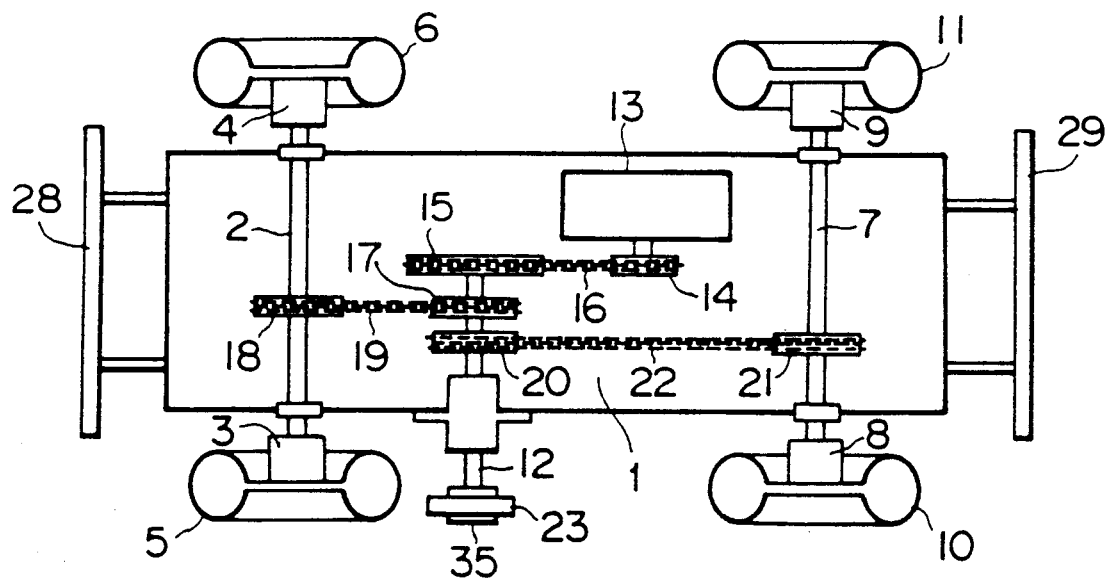
FIG. 1 is a schematic explanatory plan view of an embodiment of the present invention.
Figure 2:
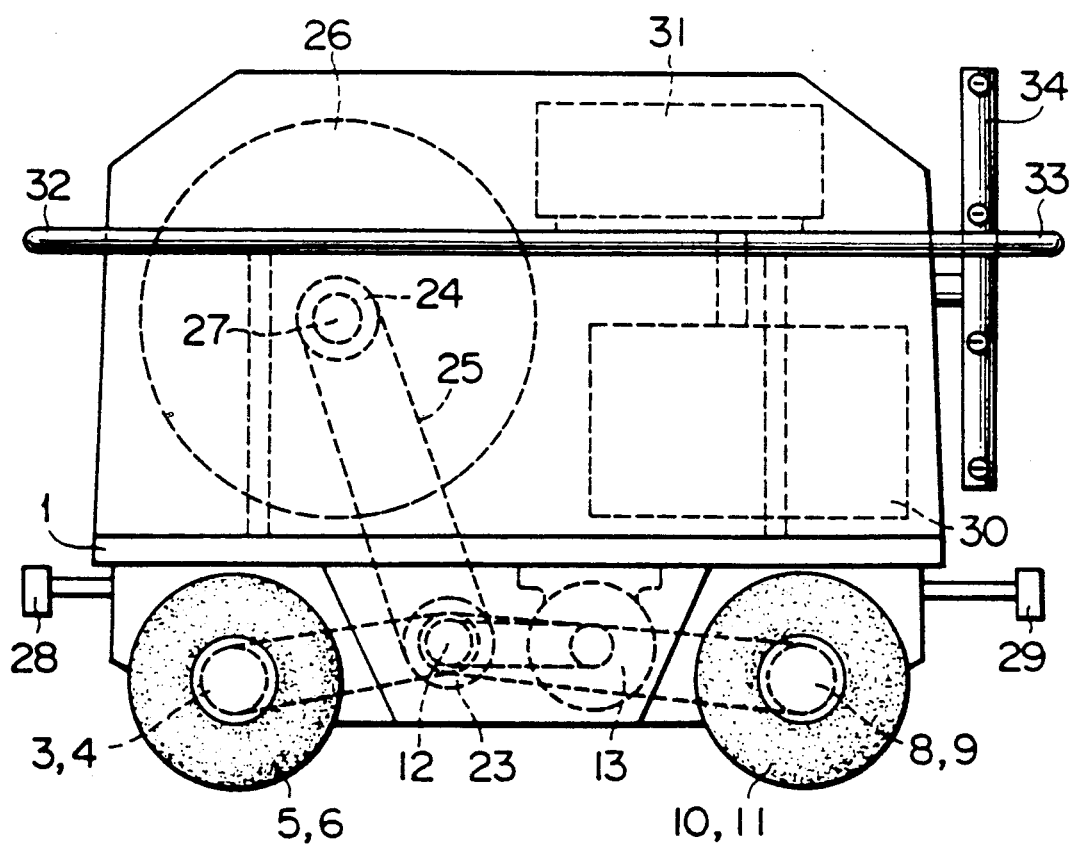
FIG. 2 is a side view of the same.

The present invention is described in detail below with reference to the embodiment shown in the appended drawings.

In the embodiment, the present invention is applied to a mobile pest control car in which an automatic hose winding reel 26 and a spray nozzle boom 34 are mounted on a carriage 1 to make it suitable for use in pest control works performed in greenhouses or the like.

The carriage 1 has wheel shafts 2, 7 which are rotatable in the longitudinal direction thereof, wheels 5, 6, 10, 11 being respectively provided at each end of the wheel shafts 2, 7 through one-way clutches 3, 4, 8, 9 of an appropriate type.

Motive power is transmitted to the wheel shafts 2, 7 by means of sprockets 14, 15, 17, 18, 20, 21 and chains 16, 19, 22 through an intermediate shaft 12 using a battery 30 as a power source and an electric motor 13 as a prime mover.

Each of the one-way clutches 3, 4, 8, 9 which are respectively interposed between the wheel shafts 2, 7 and the wheels 5, 6, 10, 11 is so disposed as to act on the front and rear wheel shafts in the opposite directions, whereby, for example, when the carriage 1 forwardly moves in the rightward direction as viewed in the drawings, the wheels 10, 11 at the front in the direction of forward movement serve as driving wheels, while the wheels 5, 6 at the rear serving as idling wheels.

Bumper-type switch members 28, 29 are respectively provided in such a manner as to project from the front and rear ends of the carriage 1. For example, when the switch member 28 at the rear end is pushed in from the neutral position while at a stop, the switch member 29 at the front end is pushed out, a switch (not shown) connected to a control circuit in a control box 31 also being turned on so as to cause the electric motor 13 to rotate in the direction in which the carriage 1 will move forwardly.

When the carriage 1 reaches the end of a furrow and the switch member 29 at the front end hits a pole (not shown) previously erected there and is thus pushed in, the switch is switched so that the electric motor 13 is caused to rotate in the reverse direction, the carriage 1 also being automatically moved in the rearward direction. When the switch member 28 at the rear end hits another pole (not shown) erected at the starting point and is thus pushed in to the neutral position, the carriage 1 is automatically stopped and the work is accordingly completed.

The hose reel 26 is driven by the sprockets 23, 24 and the chain 25 through the intermediate shaft 12 so as to wind up a hose for chemicals (not shown) which is connected to the source of the chemicals provided outside the greenhouse (not shown). A one-way clutch 27 is provided on the hose reel 26 so that, when the carriage 1 moves forwardly, the hose reel 26 idles and the hose is pulled out in correspondence with the progress of the carriage 1, while when the carriage 1 moves backwardly, the hose is automatically wound around the reel 26.

In addition, since an appropriate torque limiter 35 is interposed between the intermediate shaft 12 and the hose reel 26, the speed of travel of the carriage 1 during backward movement can be synchronized with the winding speed of the hose, and thus the hose can be securely wound around the hose reel 26 without any looseness.

During the turning operation required when the carriage 1 is to enter into the next furrow after the work along one furrow has been completed, a sharp turn is possible if the carriage 1 is forwardly turned to the right or left by raising one of handle portions 32, 33 thereof, with substantially no driving of the wheels taking place on the inside of the turn.

In addition, if an electromagnetic valve is provided on the hose (not shown) which extends from the hose reel 26 to the spray nozzle boom 34, and if a wireless control circuit is provided in the control box 31, a radio control operation from the outside of a greenhouse is possible.

Furthermore, the automation of the operation of placing the carriage in the next furrow is possible by preparing a transverse carriage which is movable in the transverse direction along a transverse path provided along one end of each of the furrows and which allows the mobile carriage of the present invention to be placed thereon and removed therefrom automatically.

What is claimed is:

1. A mobile carriage comprising wheels which are respectively rotatably mounted through one-way clutches provided between the respective wheel and wheel shafts disposed at the front and rear of said carriage driven by a power transmission means including a prime mover, the wheels at the front of said carriage in the forward moving direction thereof serving as forward driving wheels driven by said front wheel shaft through said one-way clutches thereon, and the wheels at the rear of said carriage in the forward moving direction thereof serving as free wheels by virtue of the one-way clutches on the rear wheel shaft which rotates in the same direction of the front wheel shaft, so that said carriage can be driven backwardly and forwardly using the prime mover.

2. A mobile carriage having a front and a rear comprising in combination:

a plurality of wheels disposed at the front and rear of said carriage;

a one-way clutch located at each of said wheels;

front and rear shafts connected to said one-way clutches;

a prime mover for driving said carriage connected to each of said shafts;

wherein when said carriage moves in a front direction, said wheels at the front are powered through said one-way clutches on the front; and wherein said carriage moves in a rear direction, said wheels at the rear are powered through said one-way clutches on the rear.

3. A mobile carriage in accordance with claim 2 wherein said prime mover changes direction, thereby reversing the direction of movement of said carriage.

4. A mobile carriage in accordance with claim 3, further comprising a bumper switch means for controlling rotational direction of the prime mover.

5. A mobile carriage in accordance with claim 2 wherein said prime mover rotates all of said shafts when said carriage moves in said front or rear directions.

* * * * *